United States Patent
Mailhe et al.

(10) Patent No.: US 10,360,697 B2
(45) Date of Patent: Jul. 23, 2019

(54) FAST SPARSE COMPUTED TOMOGRAPHY IMAGE RECONSTRUCTION FROM FEW VIEWS

(71) Applicant: Siemens Healthcare GmbH, Erlangen (DE)

(72) Inventors: Boris Mailhe, Plainsboro, NJ (US); Johannes Flake, Princeton, NJ (US); Qiu Wang, Princeton, NJ (US); Mariappan S. Nadar, Princeton, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 6 days.

(21) Appl. No.: 15/742,544

(22) PCT Filed: Sep. 2, 2015

(86) PCT No.: PCT/US2015/048106
§ 371 (c)(1),
(2) Date: Jan. 8, 2018

(87) PCT Pub. No.: WO2017/039651
PCT Pub. Date: Mar. 9, 2017

(65) Prior Publication Data
US 2018/0204355 A1    Jul. 19, 2018

(51) Int. Cl.
*G06T 11/00* (2006.01)

(52) U.S. Cl.
CPC ......... *G06T 11/003* (2013.01); *G06T 11/006* (2013.01); *G06T 2211/424* (2013.01); *G06T 2211/436* (2013.01)

(58) Field of Classification Search
USPC .................................................. 382/128, 131
See application file for complete search history.

(56) References Cited

U.S. PATENT DOCUMENTS

| | | | |
|---|---|---|---|
| 6,765,981 B2* | 7/2004 | Heumann | G01N 23/046 378/4 |
| 7,983,465 B2* | 7/2011 | Leroux | G06T 11/006 250/363.04 |

(Continued)

OTHER PUBLICATIONS

International Search Report for Corresponding International Patent Application No. PCT/US2015/048106, dated Jun. 3, 2016.

(Continued)

*Primary Examiner* — Ishrat I Sherali

(57) ABSTRACT

A method for performing Computed Tomography (CT) reconstruction includes acquiring a sparse measurement matrix using a CT scanner and applying a reconstruction process over a number of iterations to reconstruct image data from the sparse measurement matrix. The reconstruction process performed during each respective iteration includes generating a random view subset and determining a portion of the sparse measurement matrix corresponding to the random view subset. The reconstruction process further includes performing a stochastic gradient descent on the portion of the sparse measurement matrix to yield an image, applying a proximal total variation regularization to the image, and adjusting a step size associated with the stochastic gradient descent.

20 Claims, 10 Drawing Sheets

(56) References Cited

U.S. PATENT DOCUMENTS

| | | | | |
|---|---|---|---|---|
| 2004/0022348 A1* | 2/2004 | Heumann | ............ | G01N 23/046 |
| | | | | 378/4 |
| 2008/0180580 A1* | 7/2008 | Kadrmas | ............... | G06T 11/003 |
| | | | | 348/744 |
| 2012/0128265 A1 | 5/2012 | Silver et al. | | |
| 2016/0242721 A1* | 8/2016 | Zou | ..................... | A61B 6/5211 |
| 2018/0068467 A1* | 3/2018 | Wang | .................... | A61B 6/032 |

OTHER PUBLICATIONS

Kaganovsky, Yan, et al., "Compressed sampling strategies for tomography," Journal of the Optical Society of America, vol. 31, No. 7, Jun. 9, 2014, p. 1369.

* cited by examiner

Algorithm 1 $x = \text{reconstruct}(y, A, \Sigma, \lambda, x_0, P)$ $s = x_0$
$\alpha_1 = 1$
for $k = 1$ to $K$ do
　　$I = $ random view subset
　　$g = A_I^T \Sigma_I^{-2}(y_I - A_I s)$
　　$x_{k+0.5} = s + Pg$
　　$x_{k+1} = \text{prox}_{\lambda \text{TV}}(x_{k+0.5})$
　　$\alpha_{k+1} = \dfrac{1 + \sqrt{1 + 4\alpha_k^2}}{2}$
　　$s = x_{k+1} + \dfrac{\alpha_k - 1}{\alpha_{k+1}}(x_{k+1} - x_k)$
end for

*Fig. 3*

FAST SPARSE COMPUTED TOMOGRAPHY IMAGE RECONSTRUCTION FROM FEW VIEWS

TECHNICAL FIELD

The present disclosure relates generally to methods, systems, and apparatuses for applying sparse methods to Computed Tomography (CT) to facilitate image reconstruction from few views. The disclosed techniques may be applied, for example, to reduce the overall time required to acquire CT image data. In turn, this reduces the amount of radiation that the subject is exposed to during image acquisition.

BACKGROUND

Computed Tomography (CT) is an imaging technology that uses computer-processed X-ray beams to produce tomographic images of specific areas of a scanned object. Each X-ray beam comprises bundles of energy (or "photons") which, depending on the structure of the imaged material, may pass through, be absorbed by, or be redirected (i.e., scattered) by the structure. The degree to which an X-ray beam is reduced by an object during imaging is referred to as attenuation.

CT reconstruction is a computationally intensive process because the measurement operator does not possess a fast FFT-based implementation. Additionally, when reducing the radiation dose induced to the patient, one must rely on iterative reconstruction to model non-Gaussian noise and prior image knowledge, which further increases the cost.

To reduce the computational burden, iterative reconstruction methods for CT avoid considering all the measurements at each iteration. Conventional reconstruction methods include the Algebraic Reconstruction Technique for Gaussian noise and Ordered Subset EM for non-Gaussian noise. In Ordered Subset methods, the measurements are partitioned into several subsets, and at each iteration, the reconstruction is updated based on the measurements of one subset only. One can also regrid the sinogram to approach the measurement operator by an operator with parallel X-rays, which can be computed with a non-uniform Fast Fourier Transform, but this approximation can add artifacts to the reconstruction.

SUMMARY

Embodiments of the present invention address and overcome one or more of the above shortcomings and drawbacks, by providing methods, systems, and apparatuses related to computationally efficient sparse Computed Tomography (CT) image reconstruction using few views. Briefly, the techniques described herein utilize a stochastic proximal gradient loop wherein gradient descent is performed on a random subset of views followed by a proximal total variation (TV) regularization. The gradient calculation is accelerated using precondition and a momentum function (e.g., Nesterov's momentum function).

According to some embodiments of the present invention, a method for performing Computed Tomography (CT) reconstruction includes acquiring a sparse measurement matrix using a CT scanner and applying a reconstruction process over a number of iterations to reconstruct image data from the sparse measurement matrix. The reconstruction process performed during each respective iteration includes generating a random view subset and determining a portion of the sparse measurement matrix corresponding to the random view subset. The reconstruction process further includes performing a stochastic gradient descent on the portion of the sparse measurement matrix to yield an image, applying a proximal total variation regularization (e.g., a Chambolle-Pock splitting algorithm) to the image, and adjusting a step size associated with the stochastic gradient descent (e.g., using a Nesterov momentum function). In some embodiments, the size of the random view subset is increased between iterations of the reconstruction process to maintain the speed of convergence of the gradient method.

In some embodiments, the aforementioned method includes various additional features which enhance, refine, or otherwise modify the method. For example, in some embodiments, the reconstruction process performed during each respective iteration further comprises determining a measurement operator based on configuration of the CT scanner and modeling a noise covariance using the sparse measurement matrix. In these embodiments, the stochastic gradient descent is performed on the portion of the sparse measurement matrix to yield the image using (a) a portion of the measurement operator corresponding to the random view subset and (b) a portion of the noise covariance corresponding to the random view subset. The noise covariance may approximate Poisson noise as colored Gaussian noise. In some embodiments, a preconditioner transformation may be determined based on the measurement operator and used to precondition the stochastic gradient descent process. The measurement operator and the preconditioner transformation may be determined prior to acquisition of the sparse measurement matrix and stored, for example, in a computer readable medium on the CT scanner.

According to other embodiments of the present invention, an article of manufacture for performing CT reconstruction comprises a non-transitory, tangible computer-readable medium holding computer-executable instructions for performing the aforementioned method, with or without the additional features discussed above.

According to other embodiments of the present invention, a system for performing CT reconstruction includes a CT scanner configured to acquire a sparse measurement matrix and a control and computing unit comprising a reconstruction component configured to apply a reconstruction process over a number of iterations to reconstruct image data from the sparse measurement matrix. The reconstruction process performed during each respective iteration includes generating a random view subset and determining a portion of the sparse measurement matrix corresponding to the random view subset. A stochastic gradient descent is performed on the portion of the sparse measurement matrix to yield an image. Then, a proximal total variation regularization is applied to the image. Prior to advancing to the next iteration of the reconstruction process, the step size associated with the stochastic gradient descent is adjusted.

In some embodiments, the reconstruction component used in the aforementioned system includes additional features similar to those used with the methods discussed above. For example, in some embodiments, the reconstruction component is further configured to determine a measurement operator based on configuration of the CT scanner and model a noise covariance using the sparse measurement matrix. The reconstruction component may then perform stochastic gradient descent on the portion of the sparse measurement matrix to yield the image using (a) a portion of the measurement operator corresponding to the random view subset and (b) a portion of the noise covariance corresponding to the random view subset. The reconstruction component may also be configured to determine a preconditioner transformation based on the measurement operator and use that transformation to precondition the stochastic gradient descent process. The measurement operator and the preconditioner transformation may be determined prior to acquisition of the sparse measurement matrix and stored by the reconstruction component either locally on the scanner or in a remote computer readable medium.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 3 provides a description of the overall iterative reconstruction algorithm, as it may be applied in some embodiments;

DETAILED DESCRIPTION

The following disclosure describes the present invention according to several embodiments directed at methods, systems, and apparatuses for computationally efficient sparse Computed Tomography (CT) image reconstruction from a limited number of projection views. Briefly, the reconstruction technique described herein uses an Isotropic Total Variation prior to enable reconstruction from few views. Reconstruction is performed by minimizing a weighted least-square problem with a non-smooth convex constraint. This problem is solved using a proximal stochastic gradient algorithm accelerated by a momentum function (e.g., Nesterov's momentum function). The difference between stochastic and ordered subsets is that a random subset of measurements is selected per iteration instead of a fixed partition. This random selection makes each gradient an unbiased estimator of the full gradient, which accelerates the convergence and can help avoid artifacts generated by the partitioning procedure.

Figure 1:
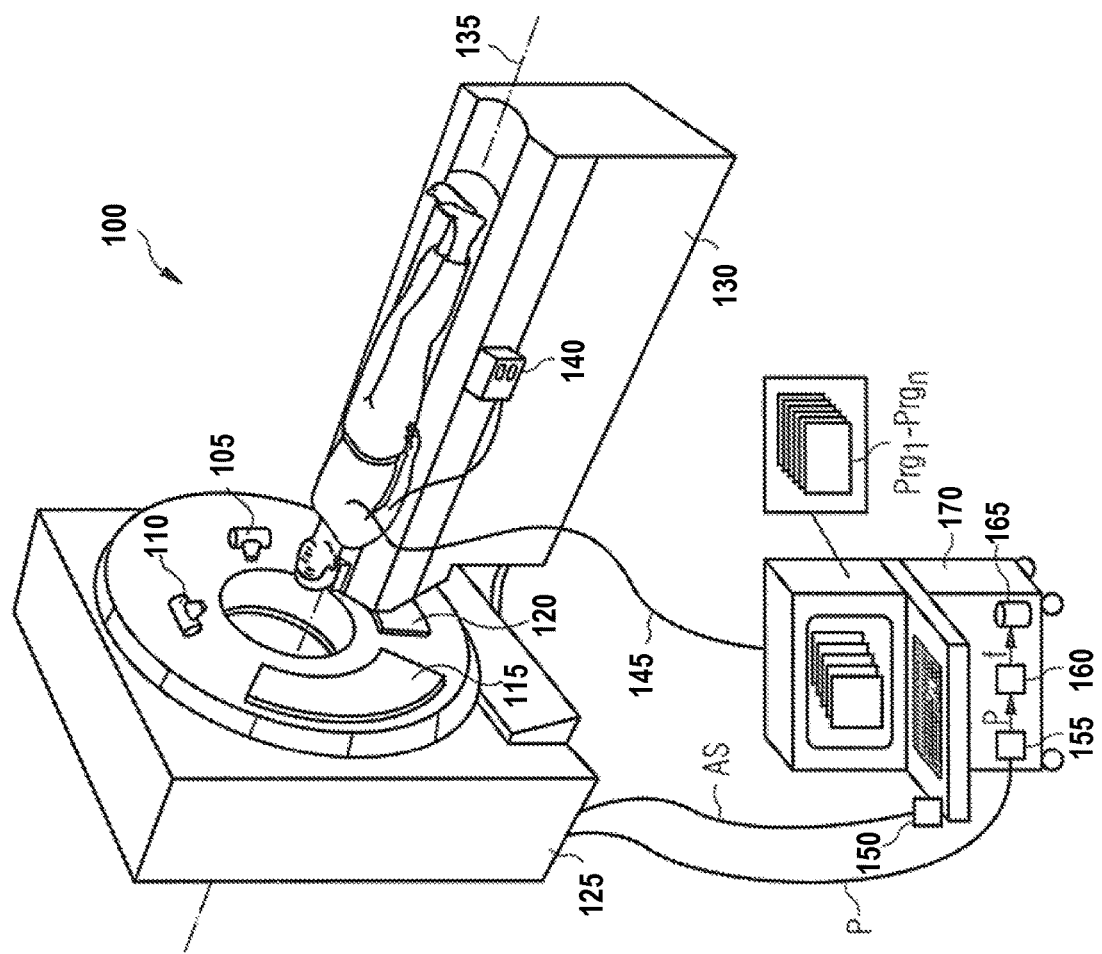
FIG. 1 shows a schematic view of a CT system.

FIG. 1 shows a schematic view of a CT system 100 having an image reconstruction component 160. Contained in the gantry housing 125 is a closed gantry (not shown in FIG. 1) on which a first X-ray tube 105 having an oppositely disposed detector 115 is arranged. Optionally, a second X-ray tube 110 having an oppositely disposed detector 120 is arranged in the CT system shown here, thereby enabling a higher time resolution to be achieved by virtue of the additionally available radiation source/detector combination, or, if different X-ray energy spectra are used in the radiation source/detector systems, also enabling "dual energy" examinations to be performed.

The CT system 100 additionally has a patient table 130 on which a patient can be moved during the examination along a system axis 135, also referred to as the z-axis, into the measurement field, wherein the scanning itself can take place both as a pure circular scan without patient advance exclusively in the examination region of interest. In this scenario the X-ray source 105 or 110 rotates around the patient in each case. In parallel therewith the detector 115 or 120 co-rotates with the X-ray source 105 or 110, respectively, in order to acquire projection measured data which are then used to reconstruct sectional images or slices. As an alternative to a sequential scan, in which the patient is moved incrementally through the examination field between the individual scans, it is of course also possible to perform a spiral scan, in which, in the course of the circumferential scanning by means of the X-ray radiation, the patient is moved continuously along the system axis 135 through the examination field between X-ray source 105 or 110 and detector 115 or 120 respectively. With a spiral scan, the movement of the patient along the axis 135 and the simultaneous rotation of the X-ray source 105 or 110 cause the X-ray source 105 or 110 to follow a helical path relative to the patient during the measurement.

The CT system 100 is controlled by way of a control and computing unit 170 having computer program code Prg1 to Prgn residing in a memory. Acquisition control signals AS can be transmitted from the control and computing unit 170 via a control interface 150 in order to control the CT system 100 in accordance with specific measurement protocols.

The projection measured data p (also referred to below as raw data) acquired by the detector 115 or 120 are passed to the control and computing unit 170 via a raw data interface 155. Following suitable preprocessing where appropriate, said raw data p are then processed further in an image reconstruction component 160. In the present example, an embodiment of the image reconstruction component 160 is implemented in the control and computing unit 170 in the form of software on a processor, e.g. in the form of one or more of the computer program codes Prg1 to Prgn. The image data f reconstructed by the image reconstruction component 160 are then stored in a memory 165 of the control and computing unit 170 and/or output in the conventional manner on the monitor of the control and computing unit 170. The data can also be fed via an interface (not shown in FIG. 1) into a network connected to the CT system 100, a radiological information system (RIS) for example, and stored in a mass storage device that is accessible there or output as images.

In addition, the control and computing unit 170 can also perform the function of an ECG, with a cable 145 being used between patient and control and computing unit 170 in order to derive the ECG potentials. In addition, the CT system 100 shown in FIG. 1 also has a contrast agent injector 140 via which contrast agent can additionally be injected into the patient's bloodstream so that the vessels of the patient, in particular the ventricles of the beating heart, can be visualized more clearly. Furthermore this also affords the possibility of performing perfusion measurements, to which the proposed method is likewise suited.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

If the images acquired using the CT system 100 are known a priori to be K-sparse in some transform domain (i.e., the signal has only K non-zero coefficients), then they can be reconstructed at resolution N from only O (K log N) measures. In CT, reducing the number of measurements reduces the amount of radiation that a subject is exposed to during scan. Thus, compressed sensing offers the potential of reducing the potentially harmful side effects associated with CT imaging.

Maximum a posteriori (MAP) image reconstruction from noisy measurements y is performed by finding an image that is both sparse and compatible with the measurements:

$$\hat{x} = \underset{x}{\arg\min} \log p(y \mid x) + \log p_0(x)$$

where log p(y|x) represents the measurement and noise model, while log $p_0(x)$ represents the sparse prior. For CT, the acquisition protocol has a potentially multi-row fan beam geometry with few equiangular views. The noise model may be represented by the sum of shot and electronic noises. When each measurement is not low dose, the noise is approximately Gaussian with diagonal variance.

Figure 2:
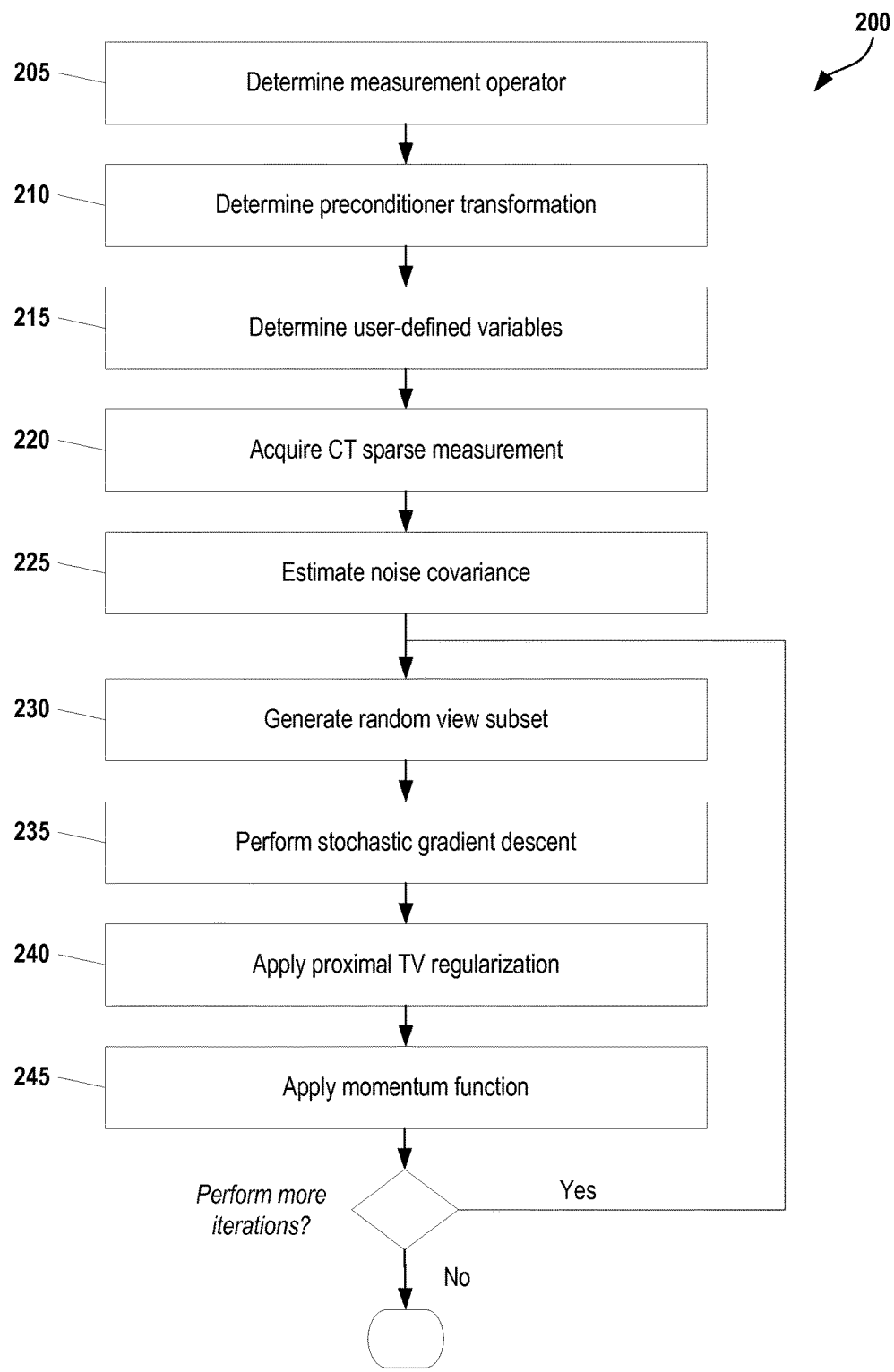
FIG. 2 provides a flow chart illustrating a process for fast sparse CT image reconstruction from few views, according to some embodiments.

FIG. 2 provides a flow chart illustrating a process 200 for fast sparse CT image reconstruction from few views, according to some embodiments. During steps 205-215 information related to the scanner configuration is acquired. In some embodiments, this information is acquired in a pre-operative setting and stored in computer readable medium on the CT scanner for later use during reconstruction. In other embodiments, the information collected at steps 205-215 is determined immediately prior to (or in parallel with) the acquisition of the CT image. At step 205, the configuration of the CT scanner is used to determine a measurement operator A. The configuration details used in determining A may include, for example, the body part of the subject being imaged or the field of view. Next, at step 210, a preconditioner transformation P is determined based on A. As is generally understood in the art, such a transformation conditions a given problem into a form that is more suitable for numerical solving methods. As discussed below, the preconditioner transformation P is used to accelerate the gradient descent algorithm performed during reconstruction. At step 215, the following user-defined variables are determined: a regularization term λ, the number of iterations of the algorithm to perform K, the size of the random view subset I that will be used during reconstruction. In some embodiments, these user-defined variables are supplied prior to the scan and stored locally by the scanner for later use in reconstruction. In other embodiments, the user-defined variables may be supplied during or immediately following the CT acquisition (e.g., via a graphical user interface associated with the CT scanner).

Continuing with reference to FIG. 2, at step 220, the CT scanner (see FIG. 1) is used to acquire sparse measurement data representative of a subject. At step 225, the sparse measurement data is used to estimate a noise covariance matrix Σ associated with the CT scan. Various noise modeling techniques generally known in the art may be used for noise estimation. In some embodiments, the noise covariance approximates Poisson noise as colored Gaussian noise.

At steps 230-245, a reconstruction process is applied over the specified number of iterations K to reconstruct an image from the sparse measurement. The reconstruction process begins at step 230 where a random view subset (sized according to the user-defined parameter I) is generated. At step 235, stochastic gradient descent is performed on a portion of the sparse measurement corresponding to the random view subset to yield an image. Additionally, in some embodiments, the stochastic gradient descent calculations may incorporate the portion of the measurement operator corresponding to the random view subset and the portion of the noise covariance corresponding to the random view subset. Additionally, the preconditioner transformation P may be used to accelerate the gradient descent algorithm and eliminate blurring during reconstruction. Thus, the stochastic gradient descent calculations can be described by the following equations:

$$g = A_I^T \Sigma_I^{-2}(y_I - A_I s)$$

$$x_{k+0.5} = s + Pg$$

where s represents the previous iterate. In some embodiments, the initial iterate is determined based on an initial image (e.g., a low-resolution image or an image acquired pre-operatively). In other embodiments, the matrix may be initialized to zero pixels, without loss of generality.

At step 240, a proximal total variation (TV) regularization is applied to the image. TV regularization is a popular conventional image regularization technique due to its ability to preserve edges. Continuing with terminology presented above, the proximal TV regularization may be described by the following equation:

$$x_{k+1} = \text{prox}_{\lambda TV}(x_{k+0.5})$$

In some embodiments, the cost function associated with the proximal TV regularization is solved using alternating direction method of multipliers (ADMM). In other embodiments, the Chambolle-Pock splitting algorithm may be used. Additional details on the benefits of TV regularization are discussed below with reference to FIG. 4.

Returning to FIG. 2, at step 245, a momentum function is used to adjust the matrix corresponding to the step size of the gradient. Any momentum function generally known in the art may be used at step 245. For example, in some embodiments, a Nesterov momentum function may be used to update the matrix s as follows:

$$\alpha_{k+1} = \frac{1 + \sqrt{1 + 4\alpha_k^2}}{2}$$

-continued $$s = x_{k+1} + \frac{\alpha_k - 1}{\alpha_{k+1}}(x_{k+1} - x_k)$$

Partial gradient methods such as described in FIG. 2 are known to converge fast initially, and then slow down as the iterations increase. To circumvent this, in some embodiments, the size of subset may be increased during the reconstruction to maintain the convergence speed.

FIG. 3 provides a description of the overall iterative reconstruction algorithm 300, as it may be applied in some embodiments.

Figure 4:
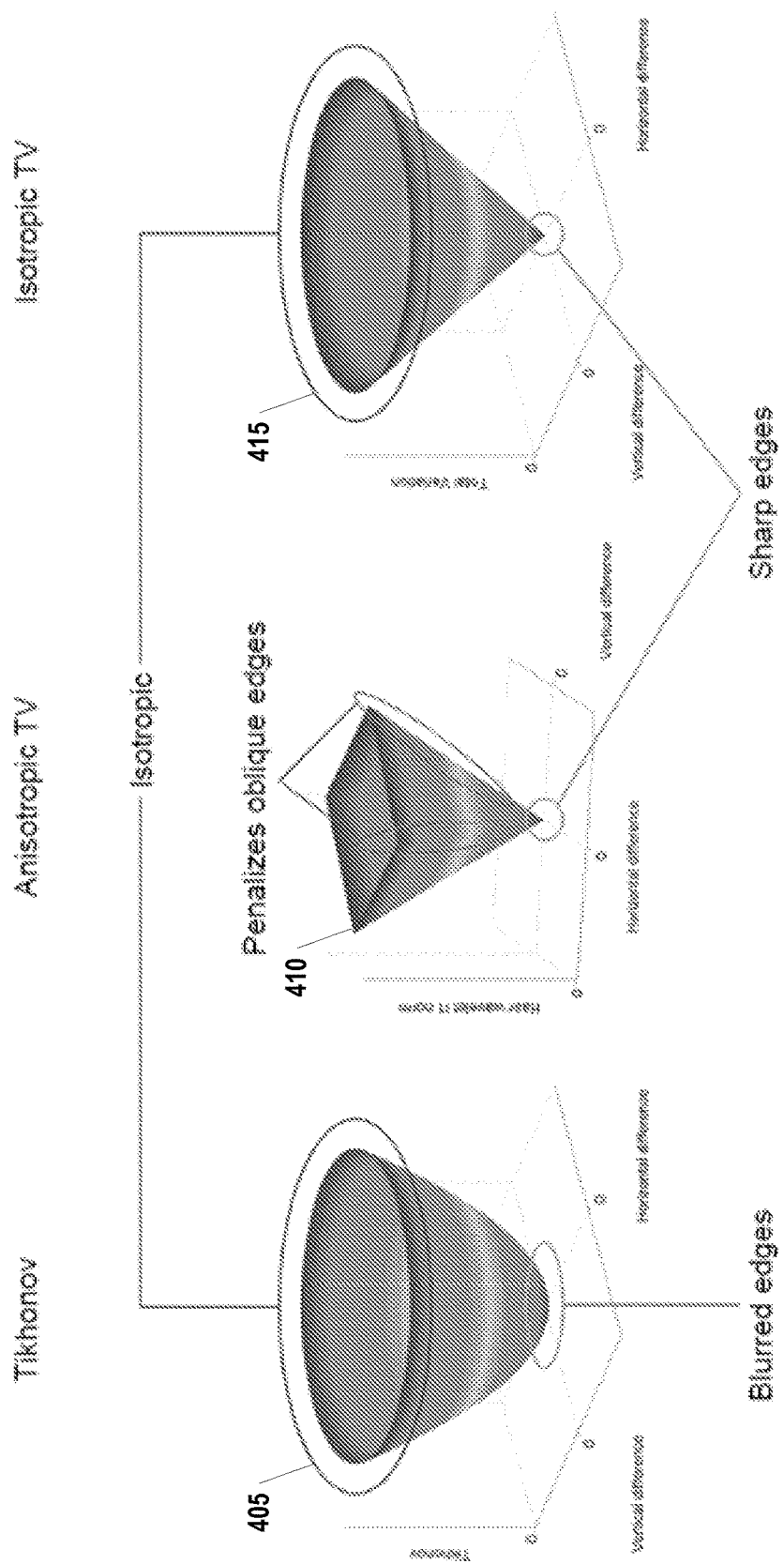
FIG. 4 provides an explanation of how isotropic TV offers benefits to image reconstruction not found in other conventional regularizers.

FIG. 4 provides an explanation of how isotropic TV offers benefits to image reconstruction not found in other conventional regularizers. Three plots 405, 410, 415 are shown, each corresponding to a different cost function. Plot 405 corresponds to a Tikhonov regularizer. Here, to regularize the image, the difference of the image is determined horizontally and vertically. Then, the $L_2$ norm of the difference result is determined. Looking form the top of the Plot 405, depending on the horizontal and vertical difference values, the plot appears as a series of circles on the level set. This means that the corresponding regularizer is invariant on the actual orientation of the edges (i.e., it will penalize edges in any orientation in the same way). This type of regularizer is desirable because it does not force the edge to be horizontal or vertical. However, at the same time, the cost function is flat close to values of 0. This means that the cost function has a tendency to blur edges of the image. This penalizes small variations in the data. For example, going from one value to another with a large step in between, the cheapest way to do it is smoothly with small increments. This results in blurring rather than a sharp edge.

Plot 410 depicts the results from an anisotropic TV regularizer. Here, the plotted data is acquired by computing an $L_1$ norm rather than a $L_2$ of the horizontal and vertical differences. This results in a sharp point at values of 0 horizontal and vertical difference. In turn, this provides sharpness at the edges of the image. However, in contrast, the circles presented in Plot 405, Plot 410 has sharp edges towards the axis. This means the cost function penalizes oblique edges more than horizontal or vertical edges.

Plot 415 shows data acquired using a isotropic TV regularizer. Here the $L_2$ norm of the horizontal and vertical difference is determined as in the Tikhonov regularization (i.e., Plot 405). This causes the data in Plot 415 to be circular around difference values, as in Plot 405. Additionally, a cost function similar to the one employed by the anisotropic TV regularizer (Plot 410) is used to provide the sharp point at difference values of 0, thus minimizing blurring. Thus, the isotropic TV regularizer is well suited to use in the proximal TV regularization step (see, e.g., step 240 in FIG. 2).

Figure 5A:
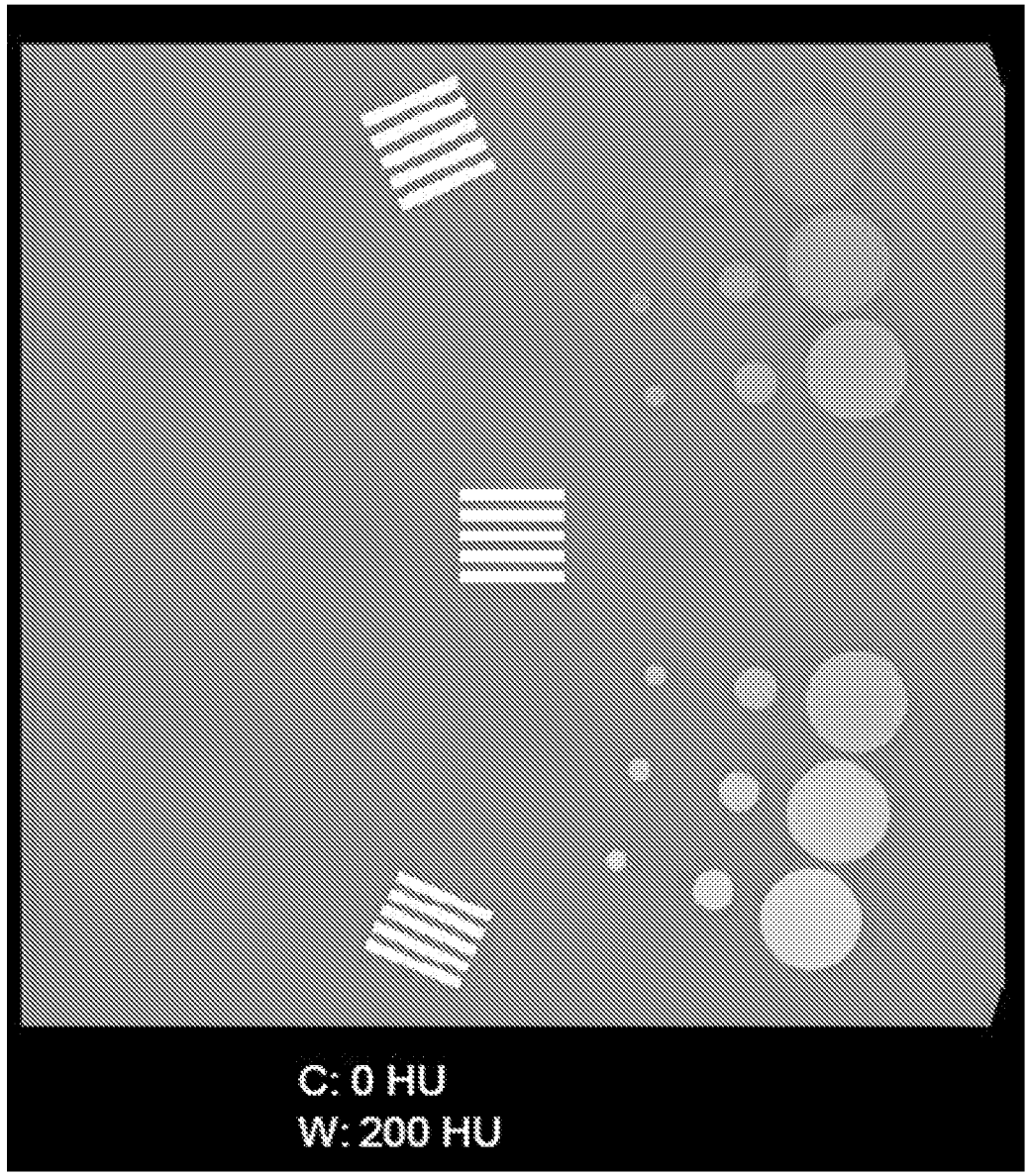
FIG. 5A provides an image showing the ground truth of an image for a first set of intensity values.
Figure 5B:
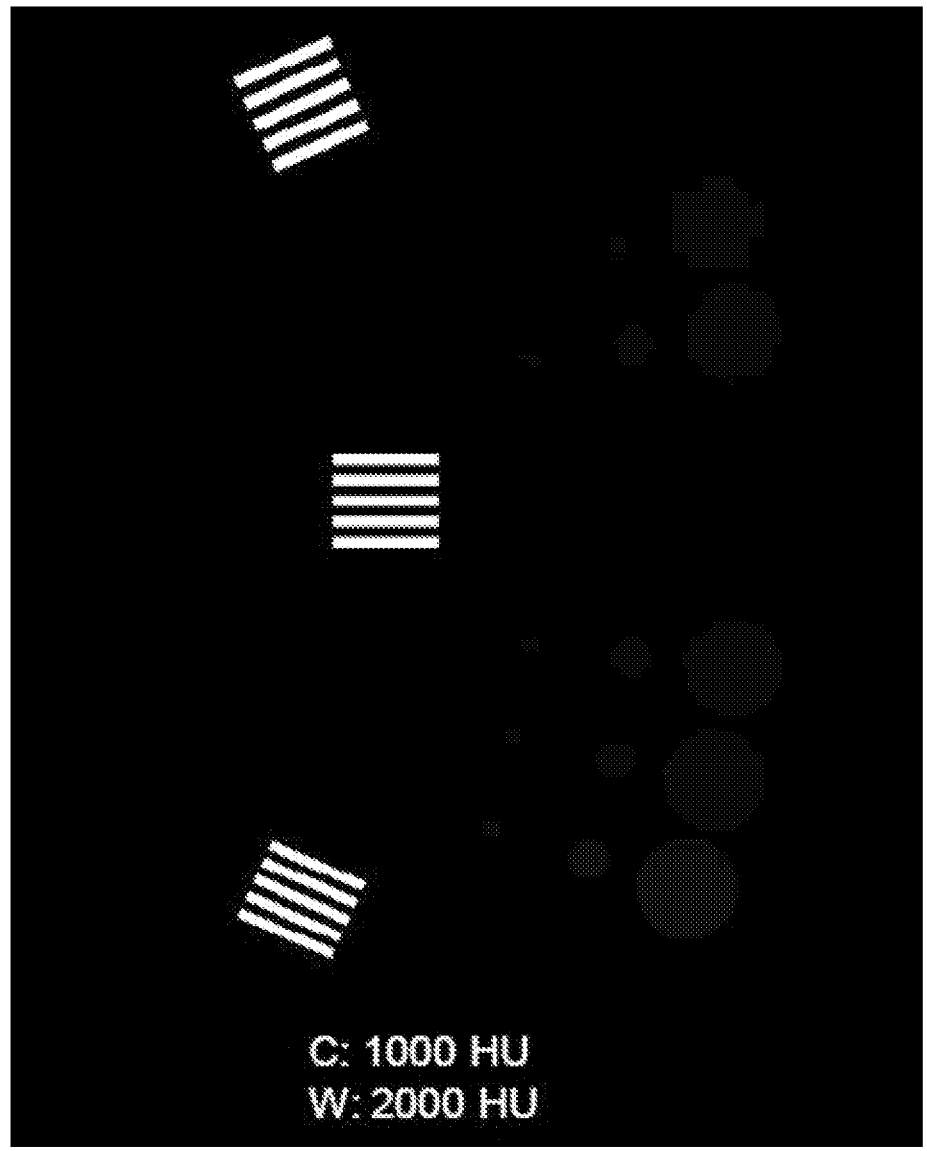
FIG. 5B provides an image showing the ground truth of an image for a second set of intensity values.

FIGS. 5A and 5B provide two images showing the ground truth of a phantom for two different display settings from the same set of intensity values. In FIG. 5A the display window center intensity is set at 0 Hounsfield units (HU), while the display window width intensity is set to 200 HU. For FIG. 5B the center intensity threshold is set at 1000 HU while the width intensity threshold is set to 2000 HU.

Figure 6A:
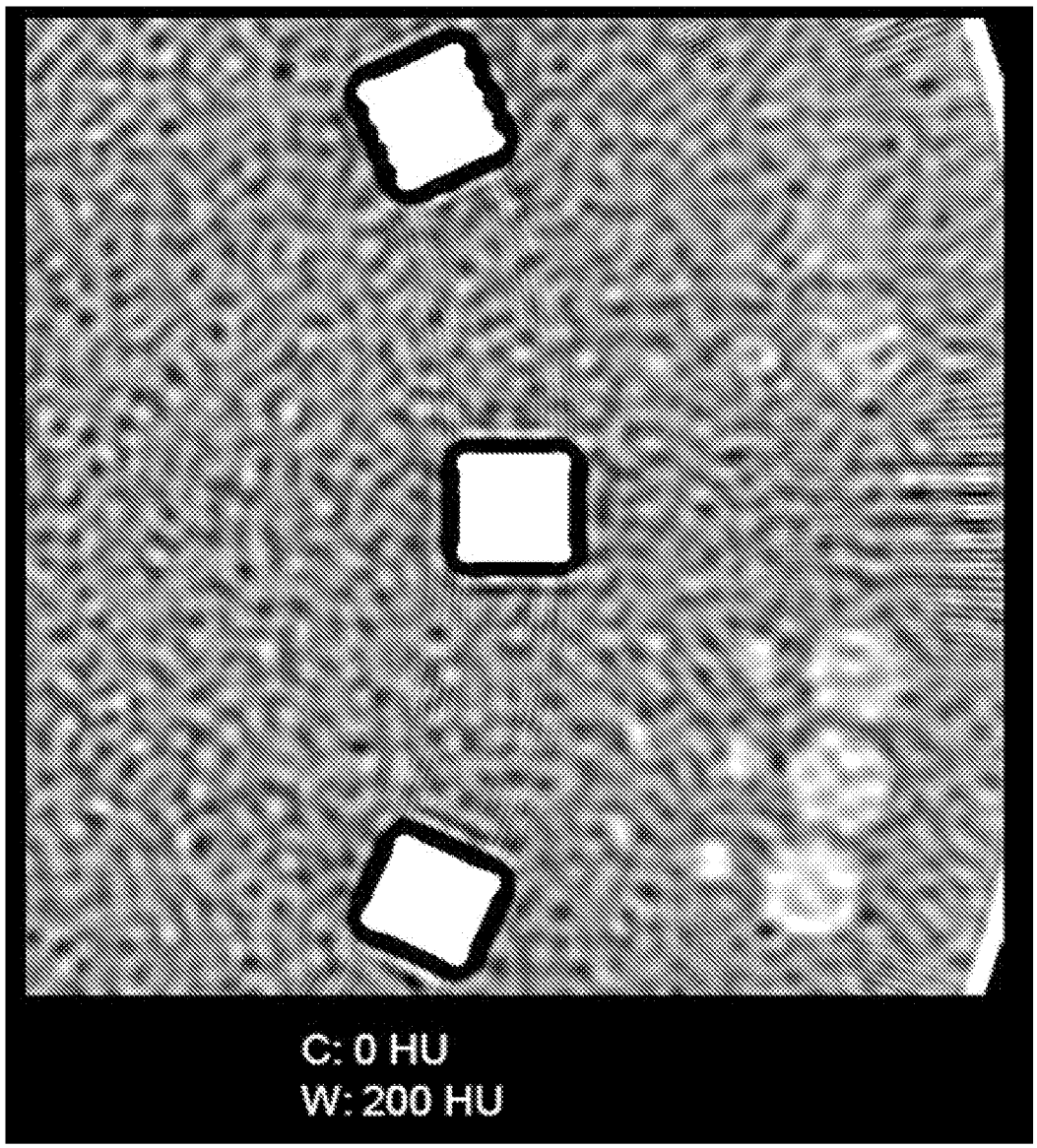
FIG. 6A shows the results of non-iterative reconstruction from 24% of the total measurements of the ground truth shown in FIG. 5A.
Figure 6B:
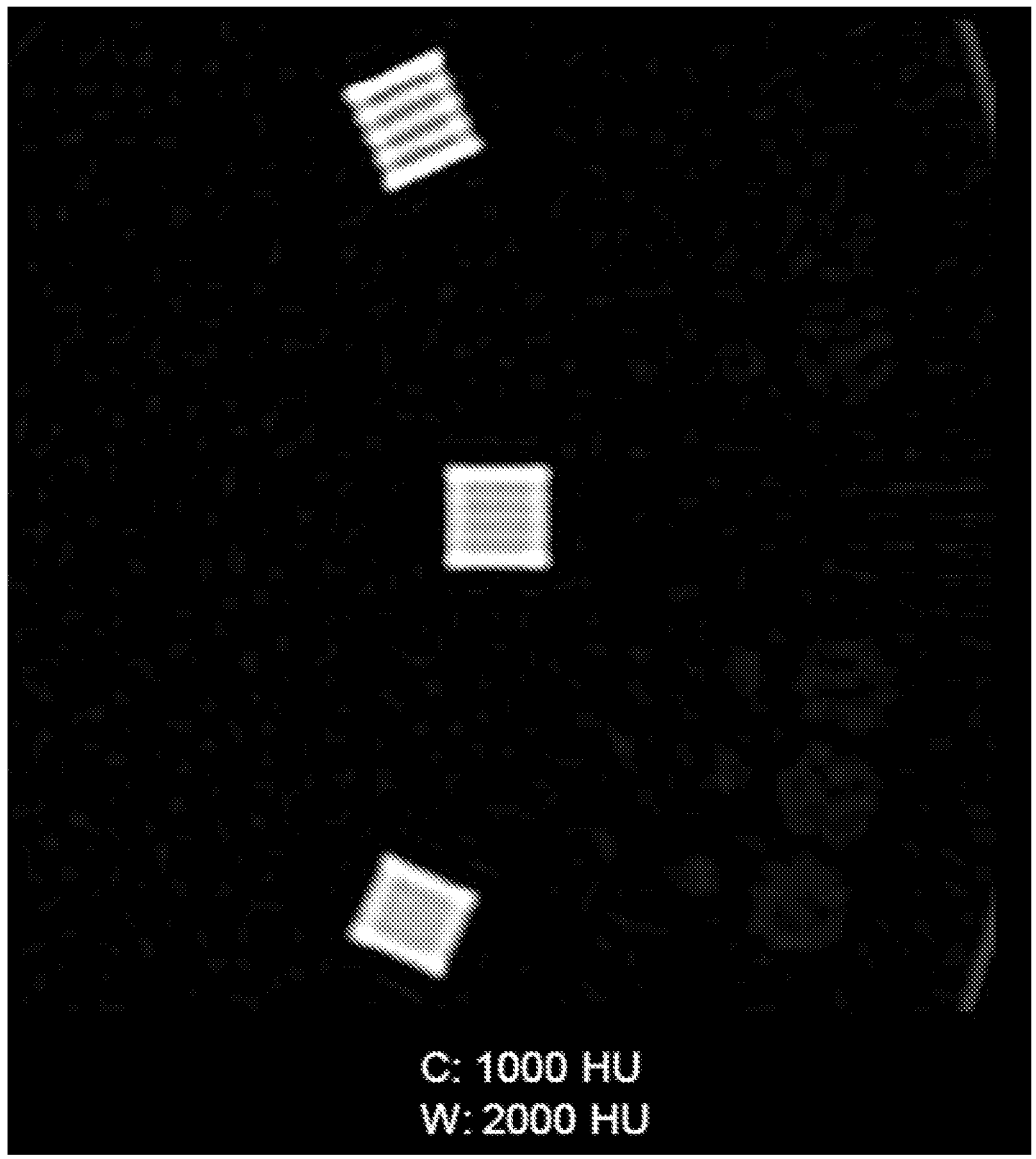
FIG. 6B shows the results of non-iterative reconstruction from 24% of the total measurements of the ground truth shown in FIG. 5B.

FIGS. 6A and 6B provide two images showing the results of non-iterative reconstruction from 24% of the measurements. The display window setting used in generating these images are identical to those used for the ground truth in FIG. 5A and FIG. 5B.

Figure 7A:
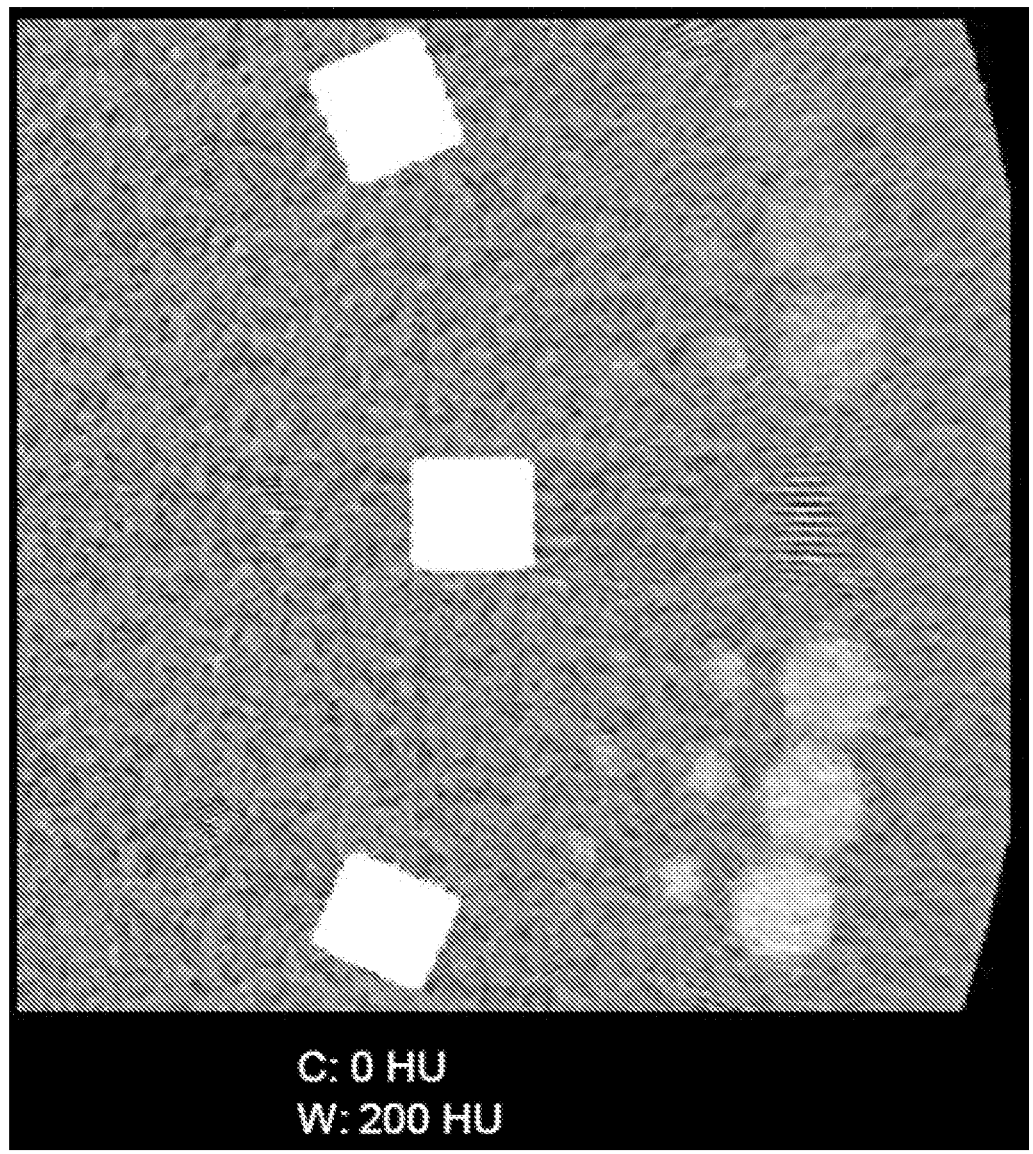
FIG. 7A shows the results of iterative reconstruction from few views from 24% of the total measurements of the ground truth shown in FIG. 5A.
Figure 7B:
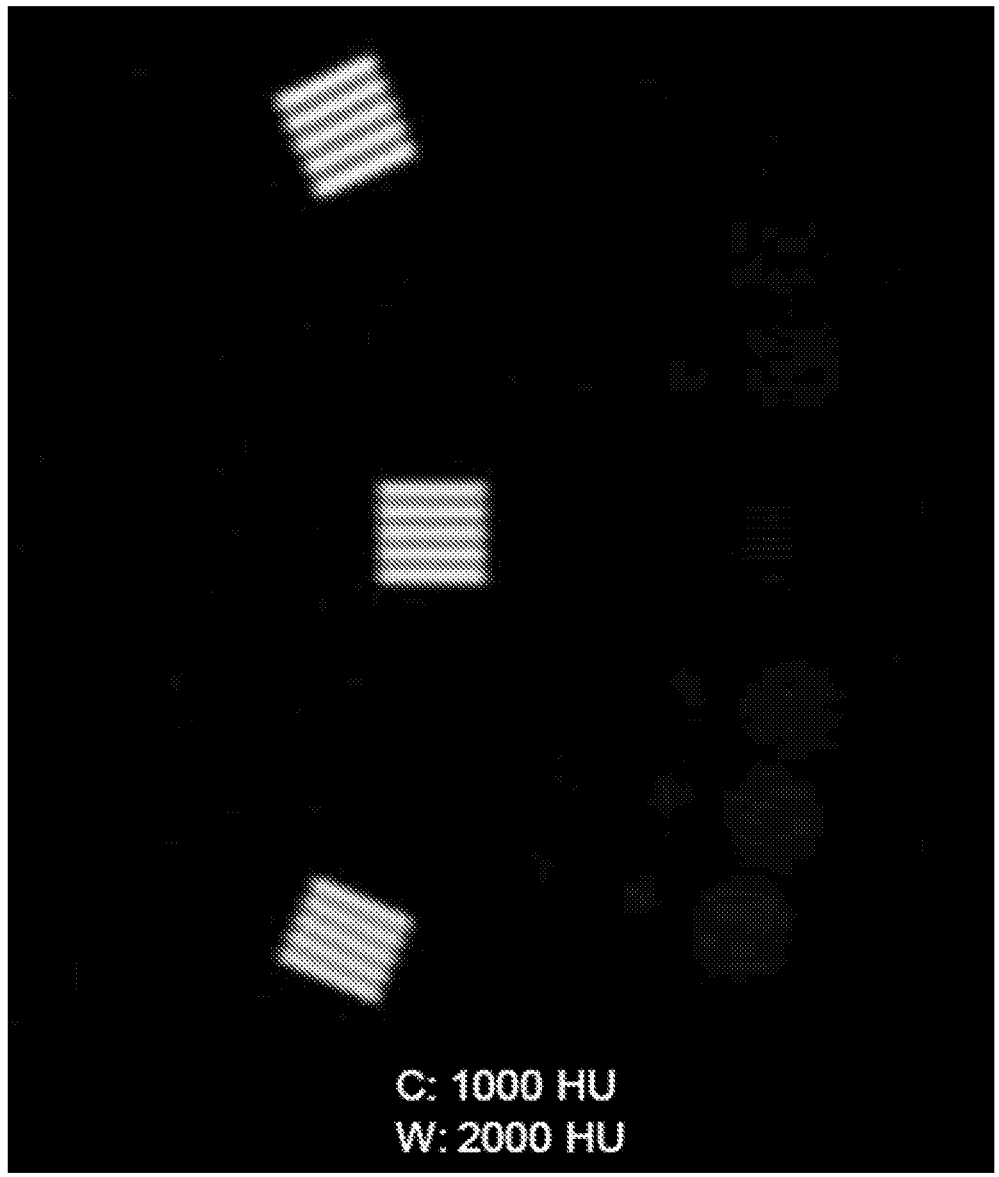
FIG. 7B showing the results of iterative reconstruction from few views from 24% of the total measurements of the ground truth shown in FIG. 5B.

FIGS. 7A and 7B provide two images showing the results of reconstruction using the iterative reconstruction technique described above with reference to FIGS. 3 and 4. As with FIGS. 6A and 6B, only 24% of the measurements are used for reconstruction. Also, the intensity thresholds used in generating these images are identical to those used for the ground truth in FIG. 5A and FIG. 5B. Note that the resolution of the lines in the phantom are significantly better compared to non-iterative case, especially for the higher intensity thresholds shown in FIGS. 6B and 7B. Additionally, the lower intensity threshold image presented in FIG. 7A lacks the black ringing of data as presented in FIG. 6A.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing systems, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity. Also, while some method steps are described as separate steps for ease of understanding, any such steps should not be construed as necessarily distinct nor order dependent in their performance.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A method for performing Computed Tomography (CT) reconstruction, the method comprising:
acquiring a sparse measurement matrix using a CT scanner;
applying a reconstruction process over a number of iterations to reconstruct image data from the sparse measurement matrix, the reconstruction process performed during each respective iteration comprising:
generating a random view subset,
determining a portion of the sparse measurement matrix corresponding to the random view subset,
performing a stochastic gradient descent on the portion of the sparse measurement matrix to yield an image,
applying a proximal total variation regularization to the image, and
adjusting a step size associated with the stochastic gradient descent.

2. The method of claim 1, wherein the reconstruction process performed during each respective iteration further comprises:
determining a measurement operator based on configuration of the CT scanner; and
modeling a noise covariance using the sparse measurement matrix,
wherein the stochastic gradient descent is performed on the portion of the sparse measurement matrix to yield the image using (a) a portion of the measurement operator corresponding to the random view subset and (b) a portion of the noise covariance corresponding to the random view subset.

3. The method of claim 2, wherein the noise covariance approximates Poisson noise as colored Gaussian noise.

4. The method of claim 2, further comprising:
determining a preconditioner transformation based on the measurement operator,
wherein the stochastic gradient descent is preconditioned using the preconditioner transformation.

5. The method of claim 4, wherein the measurement operator and the preconditioner transformation are determined prior to acquisition of the sparse measurement matrix and the method further comprises:
storing the measurement operator and the preconditioner transformation in a computer readable medium on the CT scanner.

6. The method of claim 1, wherein the proximal total variation regularization is applied to the image using a Chambolle-Pock splitting algorithm.

7. The method of claim 1, wherein the size of the random view subset is user-defined.

8. The method of claim 1, wherein the size of the random view subset is increased between iterations of the reconstruction process.

9. The method of claim 1, wherein the step size associated with the stochastic gradient descent is adjusted using a Nesterov momentum function.

10. An article of manufacture for performing Computed Tomography (CT) reconstruction, the article of manufacture comprising a non-transitory, tangible computer-readable medium holding computer-executable instructions for performing a method comprising:
receiving a sparse measurement matrix from a CT scanner;
applying a reconstruction process over a number of iterations to reconstruct image data from the sparse measurement matrix, the reconstruction process performed during each respective iteration comprising:
generating a random view subset,
determining a portion of the sparse measurement matrix corresponding to the random view subset,
performing a stochastic gradient descent on the portion of the sparse measurement matrix to yield an image,
applying a proximal total variation regularization to the image, and
adjusting a step size associated with the stochastic gradient descent.

11. The article of manufacture of claim 10, wherein the method further comprises:
determining a measurement operator based on configuration of the CT scanner; and
modeling a noise covariance using the sparse measurement matrix,
wherein the stochastic gradient descent is performed on the portion of the sparse measurement matrix to yield the image using (a) a portion of the measurement operator corresponding to the random view subset and (b) a portion of the noise covariance corresponding to the random view subset.

12. The article of manufacture of claim 11, wherein the noise covariance approximates Poisson noise as colored Gaussian noise.

13. The article of manufacture of claim 11, further comprising:
determining a preconditioner transformation based on the measurement operator,
wherein the stochastic gradient descent is preconditioned using the preconditioner transformation.

14. The article of manufacture of claim 13, wherein the measurement operator and the preconditioner transformation are determined prior to acquisition of the sparse measurement matrix and the method further comprises:
storing the measurement operator and the preconditioner transformation in a computer readable medium on the CT scanner.

15. The article of manufacture of claim 10, wherein the proximal total variation regularization is applied to the image using a Chambolle-Pock splitting algorithm.

16. A system for performing Computed Tomography (CT) reconstruction, the system comprising:
a CT scanner configured to acquire a sparse measurement matrix;
a control and computing unit comprising a reconstruction component configured to apply a reconstruction process over a number of iterations to reconstruct image data from the sparse measurement matrix, the reconstruction process performed during each respective iteration comprising:
generating a random view subset,
determining a portion of the sparse measurement matrix corresponding to the random view subset,
performing a stochastic gradient descent on the portion of the sparse measurement matrix to yield an image,
applying a proximal total variation regularization to the image, and
adjusting a step size associated with the stochastic gradient descent.

17. The system of claim 16, wherein the reconstruction component is further configured to:
determine a measurement operator based on configuration of the CT scanner; and model a noise covariance using the sparse measurement matrix, wherein the stochastic gradient descent is performed on the portion of the sparse measurement matrix to yield the image using (a) a portion of the measurement operator corresponding to the random view subset and (b) a portion of the noise covariance corresponding to the random view subset.

18. The system of claim 17, wherein the reconstruction component is further configured to:

determine a preconditioner transformation based on the measurement operator, wherein the stochastic gradient descent is preconditioned using the preconditioner transformation.

19. The system of claim 18, wherein the measurement operator and the preconditioner transformation are determined prior to acquisition of the sparse measurement matrix and the reconstruction component is further configured to:

store the measurement operator and the preconditioner transformation in a computer readable medium on the CT scanner.

20. The system of claim 16, wherein the proximal total variation regularization is applied to the image using a Chambolle-Pock splitting algorithm.

* * * * *